UNITED STATES PATENT OFFICE.

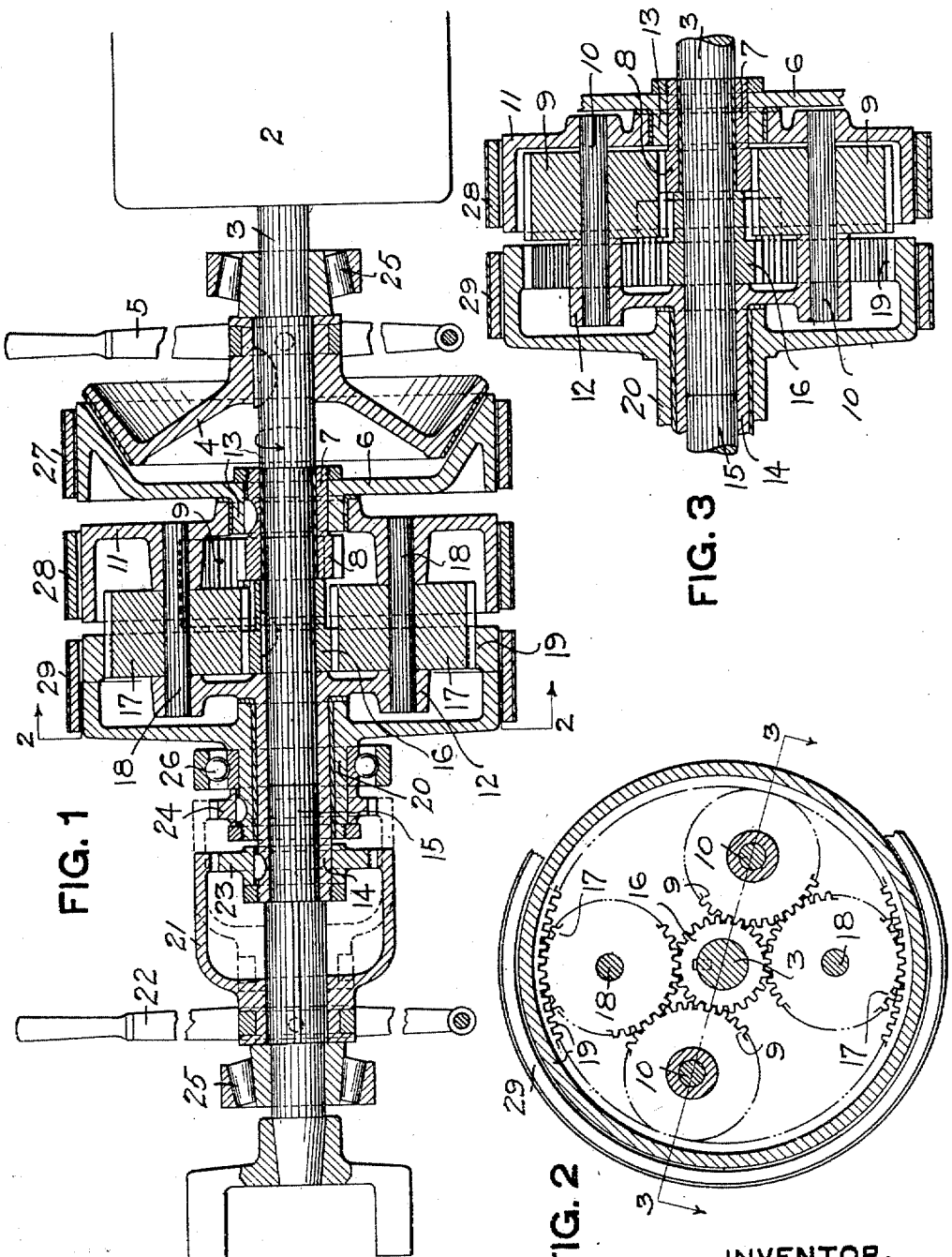

LOUIS S. CLARKE, OF HAVERFORD, PENNSYLVANIA, ASSIGNOR TO THE AUTOCAR COMPANY, OF ARDMORE, PENNSYLVANIA, A CORPORATION OF PENNSYLVANIA.

PLANETARY-GEAR MECHANISM.

980,407. Specification of Letters Patent. Patented Jan. 3, 1911.

Application filed March 26, 1910. Serial No. 551,650.

*To all whom it may concern:*

Be it known that I, LOUIS S. CLARKE, a resident of Haverford, in the county of Montgomery and State of Pennsylvania, have invented a new and useful Improvement in Planetary-Gear Mechanism; and I do hereby declare the following to be a full, clear, and exact description thereof.

My invention relates to planetary gear mechanism.

The object of my invention is to provide a planetary gear mechanism in which three speeds are obtained from a construction which would normally be capable of giving only two speeds, and this I accomplish by the employment of certain clutch-mechanism, all as fully hereinafter set forth and claimed.

In the drawing, Figure 1 is a longitudinal sectional view of my improved planetary gear mechanism; Fig. 2 is a section on the line 2—2, Fig. 1, looking in the direction of the arrow; and Fig. 3 is a section on the line 3—3, Fig. 2.

It is to be understood that my invention is applicable for the driving of automobiles, or for any other uses to which it may be found applicable.

In the drawing, the numeral 2 designates a suitable motor, and 3 the motor-shaft. Keyed to the shaft 3, and slidable thereon, is the friction clutch-member 4, which is operated by the lever 5. This clutch-member 4 is adapted to be thrown into engagement with the clutch-member 6, which is keyed to the sleeve portion 7 of the pinion 8. This pinion is loosely mounted on the shaft 3. The pinion 8 meshes with the planet-gears 9, which are mounted on the shafts 10 which connect the housings 11 and 12. The housing 11 is adapted to rotate freely on the hub 13 of the friction clutch member 6. The housing 12 has the sleeve portion 14 surrounding the shaft 3 and the shaft 15.

A pinion 16 is keyed to shaft 3 and said pinion meshes with the planet-gears 17 on the shafts 18. The planet-gears 9 and 17 overlap and mesh with each other while the planet-gears 17 also mesh with the internal-gear member 19. This internal-gear 19 has the sleeve portion 20.

A sliding dog clutch member 21 is keyed to the shaft 15 and said clutch member is operated by means of the lever 22. This clutch dog 21 is adapted to be thrown into engagement with the clutch member 23, secured to the sleeve 14 of the housing 12, or is adapted to be thrown into engagement with the clutch member 24 on the sleeve 20 of the internal gear 19. Suitable roller bearings 25 are employed for supporting the mechanism at the ends while the annular ball bearing 26 is employed where the two shafts 3 and 15 come together.

The brake-bands 27, 28, and 29 are provided for the friction clutch-member 6, the housing 11 and the internal gear 19, respectively.

When my improved planetary gear mechanism is in operation, the three speeds are obtained in the following manner: the first or direct speed is secured by throwing the sliding clutch member 4 into engagement with the friction clutch member 6 with the sliding dog clutch member 21 in engagement with the clutch member 23. In this case the drive is by the friction member 6 through gear 8 and planet gears 9 and 17 by the housings 11 and 12 to the clutch 23. The second speed drive is obtained by holding the friction-member 6 in engagement with the brake-band 27. The drive is by the pinion 16 through the planet gears 9 and 17. The planet gears 9 roll around the pinion 8 and through housings 11 and 12 to clutch 23. The third speed is obtained by applying the brake-band 29 to the internal-gear 19 and the drive is through pinion 16 to planet gears 17 and housings 11 and 12 to clutch 23. In this case the planet gears 17 and 9 with the housings 11 and 12 roll around inside of the internal-gear 19.

To reverse, the brake is applied to the housing 11 by the band 28, and the clutch dog 21 is thrown into engagement with the clutch 24. The planetary gears 9 and 17 are stationary and the driving pinion 16 rotates planet 17 to drive internal gear 19 in reverse direction, and through the sleeve 20 the clutch 24.

By my invention I am enabled to obtain a three-speed planetary gear out of one that would normally be of two speeds only, by the employment of the clutches 23 and 24. However, I do not wish to limit myself to any particular form of mechanism for obtaining this reverse, and in fact do not wish to limit myself in any sense to the particular mechanism illustrated, as my invention is of a broad character, and I desire to claim it as such.

What I claim is:

1. In planetary gear mechanism, the combination of a driving shaft, a driven shaft, a rotary housing, planet gears carried by said housing, a clutch-member, means for driving said clutch member from said driving shaft, an internal-gear member, means for braking said housing, said clutch-member, and said internal gear member independently of each other, means coöperating with said driving shaft for rotating said planet gears, a slidable clutch-member on said driven shaft, a clutch-member carried by said housing adapted to be engaged by said slidable clutch-member, and a clutch-member carried by said internal-gear member adapted to be engaged by said sliding clutch-member.

2. In planetary gear mechanism, the combination of a driving shaft, a driven shaft in line with said driving shaft, a rotary housing, planet gears carried by said housing, a clutch-member, means for driving said clutch-member from said driving shaft, an internal-gear member, means for braking said housing, said clutch-member, and said internal-gear member independently of each other, means coöperating with said driving shaft for rotating said planet gears, a slidable clutch member on said driven shaft, a clutch-member carried by said housing adapted to be engaged by said slidable clutch-member, and a clutch-member carried by said internal-gear member adapted to be engaged by said sliding clutch-member.

3. In planetary gear mechanism, the combination of a driving shaft, a pinion loosely mounted thereon, a clutch-member carried by said pinion, means for driving said clutch member from said driving shaft, a pinion rigidly secured to said driving shaft, a housing, planet gears carried by said housing, and engaged by said pinions, an internal gear member, a sliding clutch-member on said driven shaft, a clutch-member carried by said housing adapted to be engaged by said sliding clutch-member, a clutch member on said internal-gear member adapted to be engaged by said sliding clutch-member, and means for braking said first named clutch-member, said housing and said internal-gear member independently of each other.

4. In planetary gear mechanism, the combination of a driving shaft, a driven shaft, a loosely mounted pinion on said driving shaft, a clutch-member carried by said pinion, means for driving said clutch member from said driving shaft, a pinion rigidly mounted on said driving shaft, a housing, planet gears carried by said housing, and engaged by said pinions, a sleeve extending from said housing and engaging said driven shaft, an internal gear member having a sleeve surrounding said sleeve of said housing, a sliding clutch-member on said driven shaft, a clutch-member carried by the sleeve of said housing adapted to be engaged by said sliding clutch-member and a clutch-member on said sleeve of said internal gear member adapted to be engaged by said sliding clutch and means for braking said clutch-member, said housing, and said internal gear member independently of each other.

In testimony whereof, I the said LOUIS S. CLARKE have hereunto set my hand.

LOUIS S. CLARKE.

Witnesses:
ROBT. W. SIMMONS,
E. W. MILLER.